United States Patent [19]
Murray

[11] Patent Number: 5,996,178
[45] Date of Patent: Dec. 7, 1999

[54] HINGE SUITABLE FOR USE IN A FOLDABLE DEVICE

[75] Inventor: Michael Patrick Murray, Chicago, Ill.

[73] Assignee: Motorola, Inc., Schaumburg, Ill.

[21] Appl. No.: 08/950,865

[22] Filed: Oct. 15, 1997

[51] Int. Cl.[6] ..................................................... E05F 1/08
[52] U.S. Cl. ............................... 16/303; 16/284; 16/328
[58] Field of Search ............................. 16/303, 277, 284, 16/328–331, 312, 341, 342

[56] References Cited

U.S. PATENT DOCUMENTS

| | | | |
|---|---|---|---|
| 5,317,785 | 6/1994 | Kobayashi | 16/329 |
| 5,628,089 | 5/1997 | Wilcox et al. | |
| 5,640,690 | 6/1997 | Kudrna | 16/337 |
| 5,678,206 | 10/1997 | Ishii | 16/342 |
| 5,697,124 | 12/1997 | Jung | 16/341 |
| 5,704,094 | 1/1998 | Hartigan et al. | 16/303 |

OTHER PUBLICATIONS

Delrin® 100 NC010, High Viscosity Acetal Resin, DuPont Product Information, pp. 1 and 2.

*Primary Examiner*—Chuck Y. Mah
*Attorney, Agent, or Firm*—Mark D. Patrick

[57] ABSTRACT

A foldable device (100) includes two housings (102, 108) rotatably coupled by a hinge (3800) about an axis of rotation (211). The hinge (3800) has a stationary element (3802) and a movable element (3804) positioned in a pocket (3858) of one of the housings (102, 108). The movable element (3802) is restricted to movement along the axis of rotation (211). This prevents the generation of audible clicking noises that are characteristic of existing hinge arrangements.

20 Claims, 6 Drawing Sheets

HINGE SUITABLE FOR USE IN A FOLDABLE DEVICE

FIELD OF THE INVENTION

The present invention relates generally to a foldable electronic device and more particularly to a hinge suitable for use in the foldable electronic device.

BACKGROUND OF THE INVENTION

Electronic devices that are portable, such as radiotelephones, permit a user to communicate telephonically over a wireless system from virtually any location. To facilitate portability, it is known to make a radiotelephone closeable so that it has an opened position and a closed position. In the opened position, a user interface of the radiotelephone, which includes a speaker, a microphone, a display, and a keypad, is fully exposed and the radiotelephone has a length that is sufficient to allow the ear and mouth of the user to align with the speaker and microphone, respectively, to enable telephonic communication. In the closed position, the user interface is overlapped or collapsed thereby making the radiotelephone shorter in length and easily transportable.

One type of closeable radiotelephone employs two housings joined by a hinge that allows the housings to fold upon one another in the closed position. One such hinge is hinge 301 of radiotelephone 100 shown and described in U.S. Pat. No. 5,628,089 by Wilcox et al., entitled "Radiotelephone Having A Self Contained Hinge," issued May 13, 1997, and assigned to Motorola, Inc. The hinge 301 comprises a follower 403, a cam 404, and a spring 405 assembled into a cylindrically hollow can 303 via an open end thereof and held in assemblage by a cap 305 coupled to the can 303 over the open end. The cam 404 includes rails 417 that slidably engage corresponding guides 437 formed in, and running the length of, the interior surface 465 of the can 303. The can 303 is fabricated from a plastic injection molding process that releases the can 303 from the mold in the same direction as its center axis. In order to eject the can 303 from such a molding process, a draft angle in the interior surface 465 is employed. The draft angle causes the interior surface 465 and the width of the guides 437 to taper opposite the open end and, thus, cause variation in the diameter along the interior surface 465 and in the width of the guides 437. When the radiotelephone 100 is moved between the closed and opened positions, cam 404, aside from translating along the center axis of the can 303, displaces or rotates due to the nonuniformity of the interior surface 465 and the guides 437. This causes the rails 417 to hit the edges of the guides 437 and produce an audible clicking noise. The clicking noise, while desirable to those users who wish to receive audible feedback that the radiotelephone 100 is entering the closed or open position, may be undesirable to other users.

Thus, a need exists for a hinge suitable for use in a foldable device, such as a portable radiotelephone, that minimizes noise when the foldable device is moved between the closed and opened positions.

DETAILED DESCRIPTION OF THE PREFERRED EMBODIMENTS

A foldable device includes two housings rotatably coupled by a hinge about an axis of rotation. The hinge has a stationary element, such as a cam, and a movable element, such as a follower, held in engagement with the stationary element in a pocket of one of the housings. The movable element is slidably disposed in the pocket and restricted to movement along the axis of rotation. This restriction of movement prevents the generation of audible clicking noises that are characteristic of existing hinge arrangements.

Figure 1:
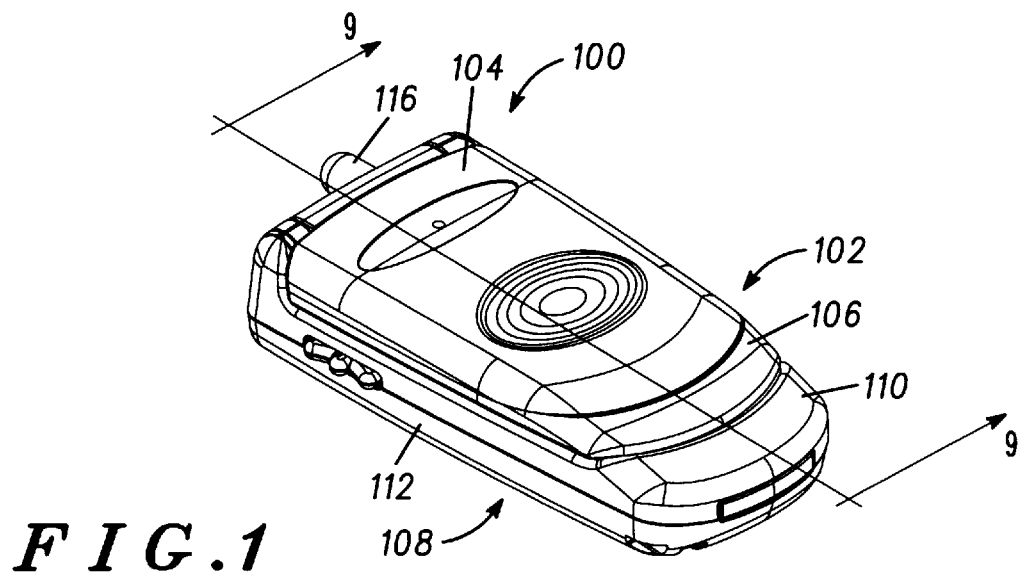
FIG. 1 is a perspective view of a foldable device employing a hinge, the foldable device in a closed position.
Figure 2:
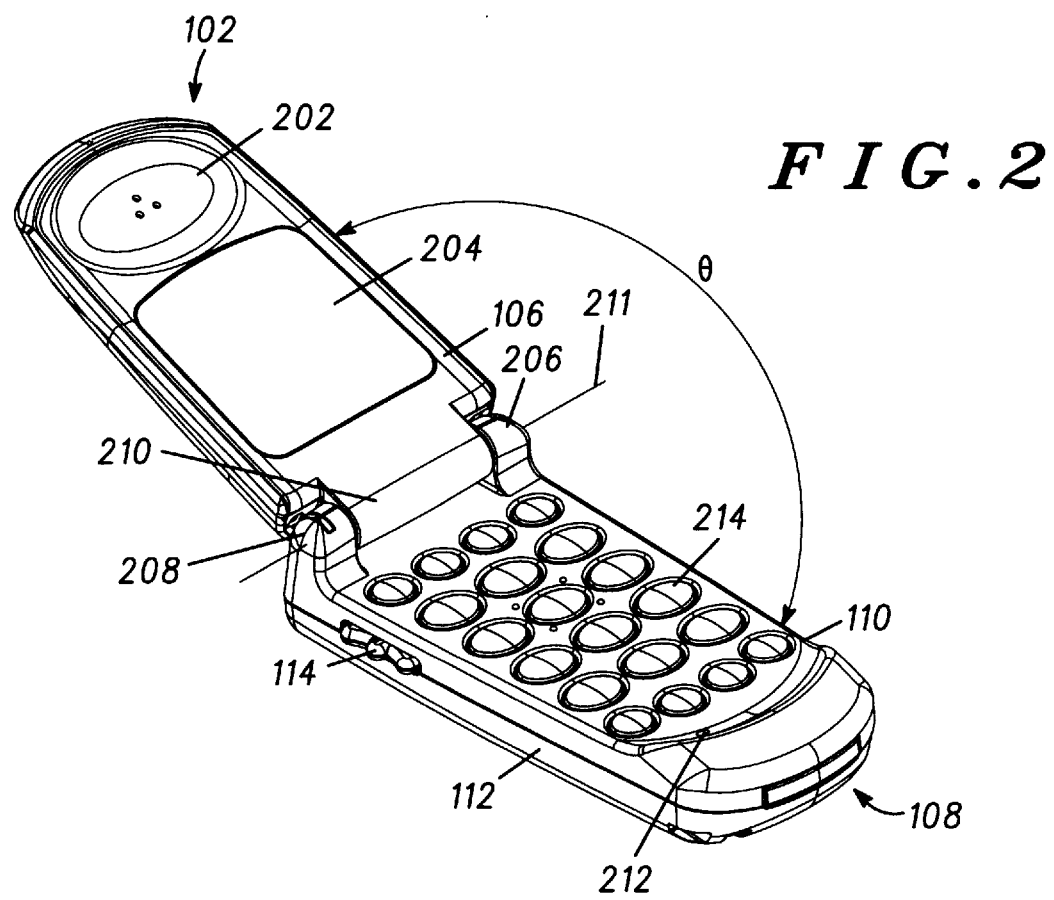
FIG. 2 is a perspective view of the foldable device of FIG. 1 in an opened position.

A foldable device, which is illustrated as a radiotelephone 100 in FIGS. 1 and 2, has top and bottom housings 102 and 108, each with respective back portions 104 and 112 and respective front portions 106 and 110. The front portion 110 of the bottom housing 108 employs spaced knuckles 206 and 208 to rotatably couple knuckle 210 of the front portion 106 of the top housing 102 therebetween. As such, the radiotelephone 100 is moveable from the closed position, shown in FIG. 1, to the opened position, shown in FIG. 2, along an axis of rotation 211 by urging the top housing 102 in a counterclockwise direction with respect to the bottom housing 108. In the closed position, the front portions 106 and 110 of the top and bottom housings 102 and 108, respectively, are held in juxtaposition with one another. In the opened position, front portion 106 of the top housing 102 is held at an obtuse angle θ with respect to front portion 110 of the bottom housing 108. In the illustrated embodiment, the angle θ is approximately 160°. In the opened position, a user of the radiotelephone 100 can listen via an earpiece 202, speak into microphone 212, enter information, such as a telephone number, via a keypad 214, and view information via a display lens 204. An antenna 116 carried on the bottom housing 108 enables wireless communication between the radiotelephone 100 and a base station (not shown) of a radiotelephone system.

Figure 3:
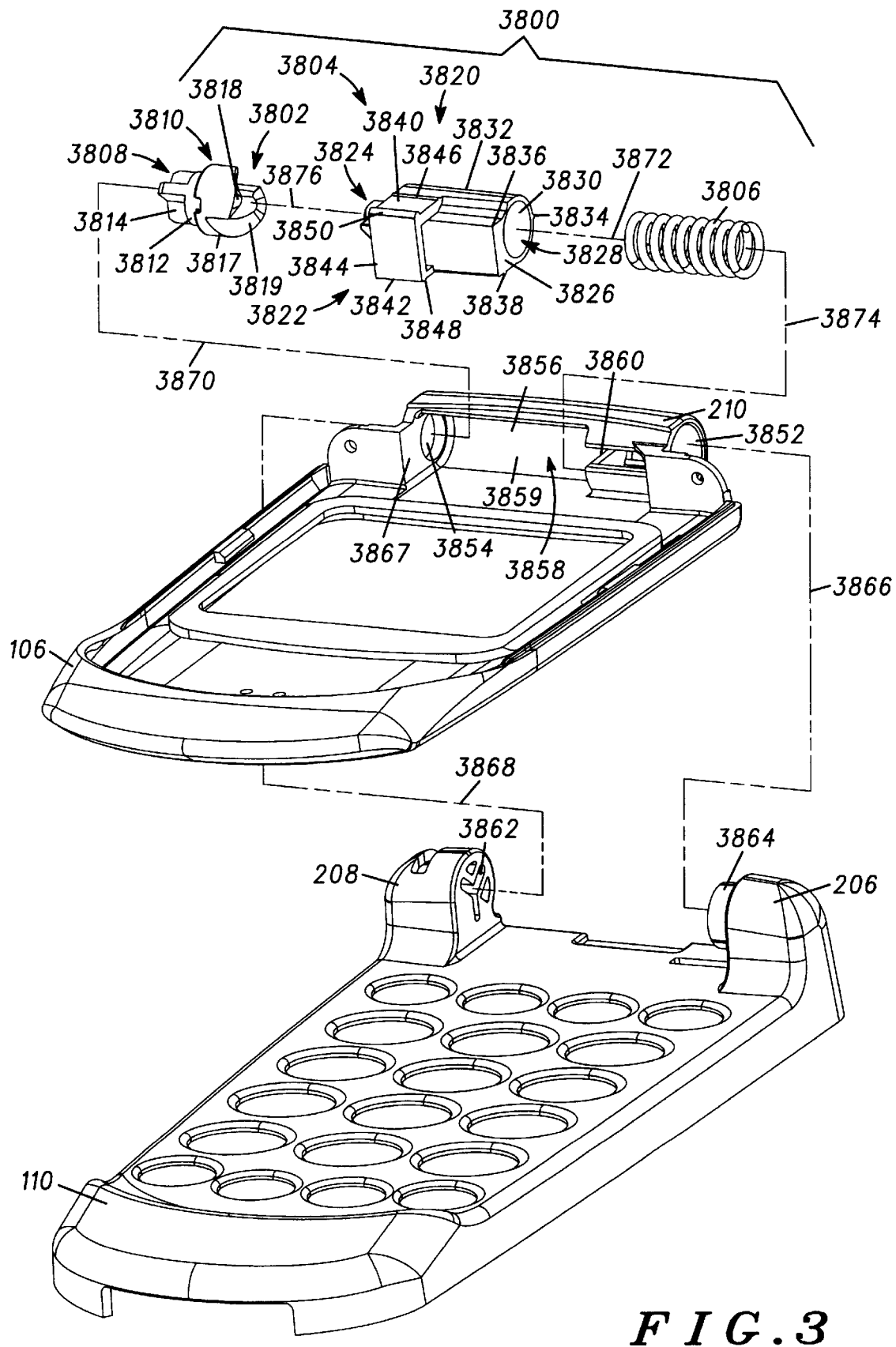
FIG. 3 is an exploded, fragmentary, perspective view of the foldable device of FIG. 1 further illustrating the hinge.
Figure 4:
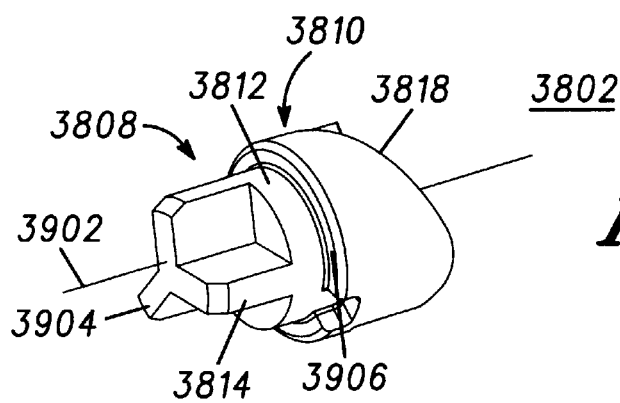
FIG. 4 is a perspective view of a cam of the hinge of FIG. 3.

A hinge 3800 of FIG. 3, when assembled, joins front portion 106 of the top housing 102 of FIG. 1 to front portion 110 of the bottom housing 108. The hinge 3800 has a stationary element, which in the illustrated embodiment is a cam 3802; a movable element, which in the illustrated embodiment is a follower 3804; and a spring 3806. The cam 3802 is shown in FIGS. 3 and 4 to be generally cylindrical with a longitudinal, center axis 3902. The cam 3802 is preferably injection molded using Delrin® 100 acetal resin commercially available from DuPont, or other suitable material. The cam 3802 has two distinct integral portions joined along the axis 3902: a head 3808 and a can 3810. Head 3808 is generally cylindrical and, in the illustrated embodiment, has a length and a diameter of approximately 4 mm. Head 3808 has a body 3812 and a prong 3814. Body 3812 is solid, disk-shaped, and coaxial to axis 3902. One end of body 3812 is contiguous with the can 3810. The other end of body 3812 is contiguous with the prong 3814. The prong 3814 is a male-type connector that is generally cylindrical with a diameter equal to that of body 3812 and triangular portions cut away to form converging surfaces perpendicular to the adjoining end of body 3812. A distal end of the prong 3814 employs a surface 3904 that defines one end of the cam 3802. In the illustrated embodiment, surface 3904 has a "Y" shape or other suitable shape, such as a "+," that maximizes surface contact with a female-type connector to prevent movement of the cam 3802 once it is assembled The can 3810 is generally cylindrical and hollow, closed at one end, and open at the other end. In the illustrated embodiment, the can 3810 has a length of approximately 4 mm, an outer diameter of approximately 6 mm, and an inner diameter of approximately 3 mm. At the closed end, the can 3810 has a generally flat circular surface 3906 joined to, and slightly larger in diameter than, head 3808. The open end of the can 3810 opposite head 3808 employs a profile 3817 about its periphery. The profile 3817 defines the other end of the cam 3802. The profile 3817 is formed of a pair of 180° symmetrical, contoured bearing surfaces 3818 and 3819. Bearing surfaces 3818 and 3819 are slightly angled downward and inward to minimize wear during operation of the hinge 3800.

Figure 7:
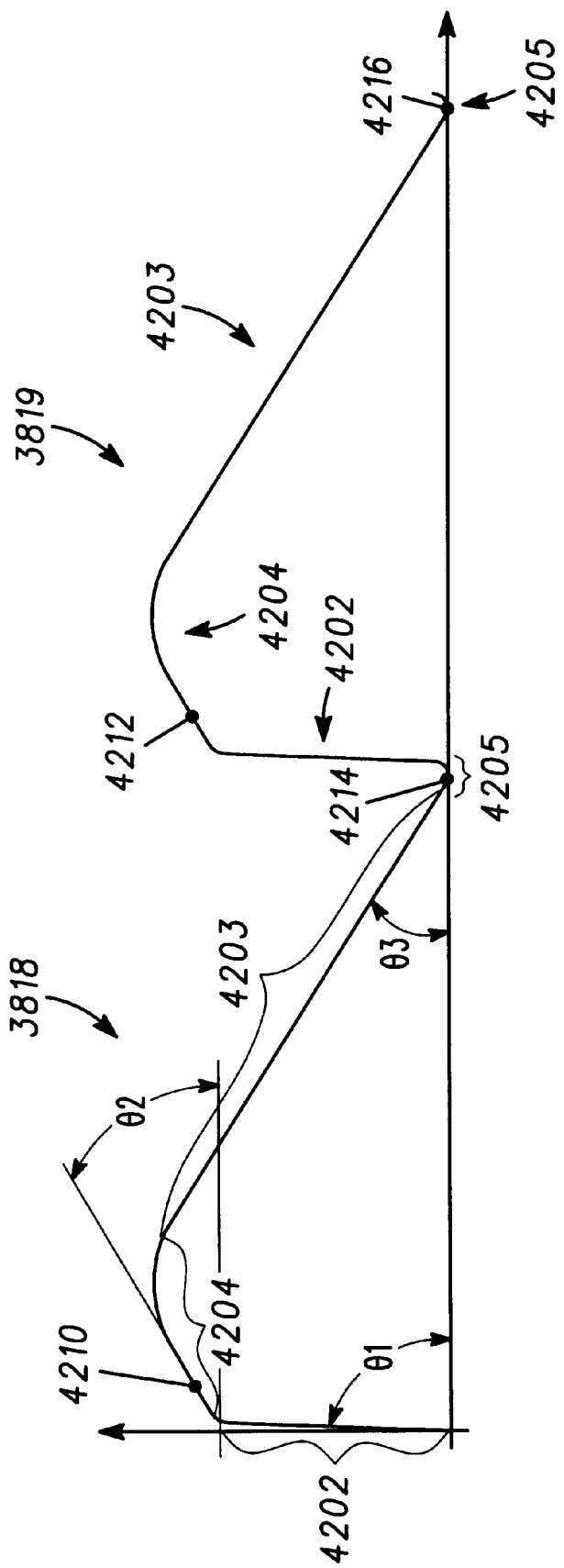
FIG. 7 is a graph illustrating a profile of the cam of FIG. 4 in two dimensions.

For clarity, the profile 3817 has been removed from the circular periphery of the open end of the can 3810 and bearing surfaces 3818 and 3819 have been mapped onto a two dimensional graph in FIG. 7, wherein the horizontal axis defines length and the vertical axis defines height. Each one of bearing surfaces 3818 and 3819 is substantially ramp shaped and includes angled segments 4202 and 4203 and curved segments 4204 and 4205. Angled segment 4202 extends upward from the horizontal axis at an angle θ1 of slightly less than 90° to join curved segment 4204. Curved segment is substantially convex and has an arm, which extends from angled segment 4202 at an angle θ2 of approximately 30° (with respect to the horizontal axis), and an arc of approximately 1 mm in radius joined on one end to the arm and joined on the other end to angled segment 4203. Angled segment 4203 extends downward from curved segment 4204 at an angle θ3 of approximately 30° (with respect to the horizontal axis) to join curved segment 4205. Curved segment 4205 is substantially concave and has an arc of approximately 0.1 mm in radius joined on one end to angled segment 4203 and joined on the other end to angled segment 4202 of bearing surface 3819.

Figure 5:
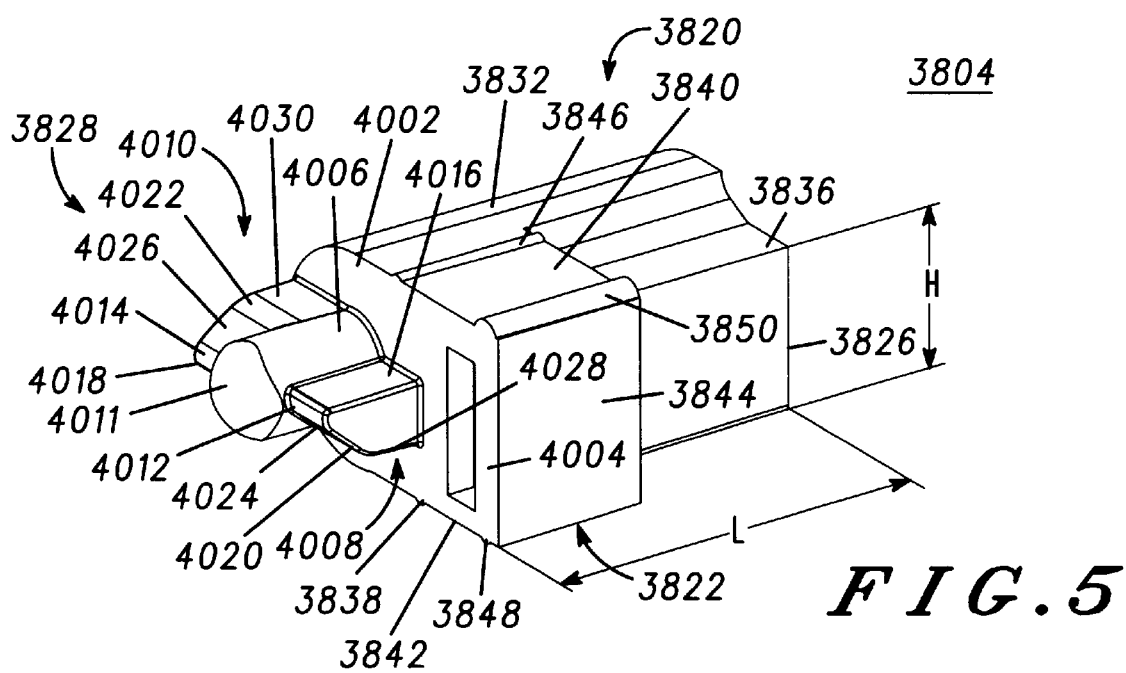
FIG. 5 is a perspective view of a follower of the hinge of FIG. 3.

The follower 3804 is shown in FIGS. 3 and 5 to be generally cylindrical. The follower 3804 is preferably injection molded from a lubricated impregnated plastic, such as Teflon impregnated nylon or other suitable fluorocarbon impregnated polymide, so as to eliminate the need for lubricating the hinge 3800. The follower 3804 has three distinct integral portions: a body 3820, an arm 3822, and a head 3824.

Body 3820 is formed of a cylindrical hollow portion laterally joined on one side to a generally rectangular solid portion. In the illustrated embodiment, body 3820 has a length L of approximately 11 mm, a height H of approximately 5 mm, and a width of approximately 7 mm. One end of body 3820 is defined by a flat front surface 4002. The other end of body 3820, which is also one end of the follower 3804, is defined by a flat rear surface 3826 with a circular opening 3828 to a cylindrical interior surface 3830. In the illustrated embodiment, opening 3828 and interior surface 3830 have a diameter of approximately 4.5 mm and interior surface 3830 has a length of approximately 10 mm. The hollow portion of body 3820 has a semi-cylindrical exterior surface 3832 that extends between the front and rear surfaces 4002 and 3826 and defines top-middle, top-left, left, bottom-left, and bottom-middle sides of body 3820. A rib 3834 is formed on exterior surface 3832 along the left side of body 3820. Rib 3834 is substantially semicircular and extends the length L of body 3820 between the front and rear surfaces 4002 and 3826. The solid portion of body 3820 has interconnected flat exterior surfaces 3836 that extend between the front and rear surfaces 4002 and 3826 and define bottom-right, right, and top-right sides of body 3820. A rib 3838 is formed on exterior surfaces 3836 along the bottom-right of body 3820. Rib 3838 is substantially semicircular and extends the length L of body 3820 between the front and rear surfaces 4002 and 3826.

The arm 3822 of the follower 3804 extends laterally from the right side of body 3820. The arm 3822 is generally rectangular and has a front surface 4004 that is coplanar with front surface 4002 of body 3820 and top and bottom surfaces 3840 and 3842 extending perpendicularly rearward from front surface 4004 for a distance of approximately 4 mm in the illustrated embodiment. Top and bottom surfaces 3840 and 3842 are coplanar with exterior surface 3832 at the top-middle of body 3820 and coplanar with the one of exterior surfaces 3836 at the bottom-right side of body 3820, respectively. A right surface 3844 extending perpendicularly between front, top, and bottom surfaces 4004, 3840, and 3842 is substantially parallel to, and in the illustrated embodiment is approximately 2 mm from, the one of exterior surfaces 3832 at the right side of body 3820. A rib 3846, which is substantially semicircular, is formed on, and extends across, top surface 3840 in proximity to exterior surface 3832 at the top-middle of body 3820. A rib 3848, which is substantially semicircular, is formed on, and extends across, bottom surface 3842 in proximity to a bottom edge of right surface 3844. A rib 3850, which is substantially semicircular, is formed on, and extends across, top surface 3840 at a top edge of right surface 3844. In the illustrated embodiment, rib 3850 has a radius that is substantially larger than that of ribs 3834, 3838, 3846, and 3848. Ribs 3834, 3838, 3846, 3848, and 3850 have no draft and are employed to provides uniformity on the exterior surfaces of the follower 3804.

Head 3824 of the follower 3804 is joined to body 3820 at front surface 4002 thereof. Head 3824 has a post 4006 and fingers 4008 and 4010. The post 4006 is substantially cylindrical and, in the illustrated embodiment, has a diameter or height of approximately 2 mm and a length of approximately 4 mm. The post 4006 is joined to front surface 4002 at one end and terminates in a dome 4011 at the other end, which also defines the other end of the follower 3804. The post 4006 functions to maintain the hinge 3800 in alignment with the axis of rotation 211 of FIG. 2. The post 4006 is positioned between fingers 4008 and 4010.

Fingers 4008 and 4010 are joined to front surface 4002 at one end, extend along and laterally adjoin opposite sides of the post 4006, and terminate in rounded tips 4012 and 4014, respectively, at the other end. In the illustrated embodiment, fingers 4008 and 4010 are approximately 3 mm in length. Tips 4012 and 4014 are formed from the convergence of respective planar, flat surfaces 4016 and 4018 of fingers 4008 and 4010 and opposing respective angled surfaces 4020 and 4022 of fingers 4008 and 4010. Flat surfaces 4016 and 4018 extend substantially perpendicularly from front surface 4002 to tips 4012 and 4014, respectively. Angled surfaces 4020 and 4022 extend from tips 4012 and 4014, respectively, to front surface 4002, first, at an angle of approximately 40° with respect to flat surfaces 4016 and 4018, respectively, as defined by first angle portions 4024 and 4026, respectively, and, next, at an angle slightly less than perpendicular with respect to front surface 4002, as defined by second angle portions 4028 and 4030, respectively. As such, fingers 4008 and 4010 are not symmetrical about tips 4012 and 4014. Also, in the illustrated embodiment, fingers 4008 and 4010 are 180° symmetrical across the post 4006. Regarding finger 4008, flat surface 4016 extends along the post 4006 at approximately three-fourths of the height of the post 4006 and the second angle portion 4028 of angled surface 4020 is substantially flush with a bottom of the post 4006. Regarding finger 4010, flat surface 4018 extends along the post 4006 at approximately one-fourth of the height of the post 4006 and the second angle portion 4030 of angled surface 4022 is substantially flush with a top of the post 4006.

The spring 3806 is spiral shaped with an outer diameter slightly less than the diameter of the circular opening 3828 and cylindrical interior surface 3830 of the follower 3804. In the illustrated embodiment, the spring 3806 is a compression spring composed of music wire or other suitable material having an outer diameter of approximately 4 mm, a length of approximately 16 mm, 12 coils, and a spring rate of approximately 5.6 N/mm. The ends of the spring 3806 are closed and ground (i.e., flattened) to facilitate mating once the hinge 3800 is assembled.

To accommodate the hinge 3800, knuckle 210 of the front portion 106 of the top housing 102 of FIG. 1 has apertures 3852, 3854, and 3856 of FIG. 3 and a pocket 3858. Aperture 3852, which is circular, is formed in one end of knuckle 210. In the illustrated embodiment, aperture 3852 has a diameter of approximately 6 mm and extends inward to define a cylindrical interior surface of knuckle 210 that is approximately 7 mm in length. Aperture 3854, which is circular, is formed in the other end of knuckle 210. In the illustrated embodiment, aperture 3854 has a diameter of approximately 4.5 mm and extends inward to define a ring-shaped interior surface of knuckle 210 that is approximately 1 mm in length. Aperture 3856 is generally rectangular and formed in at a front of knuckle 210.

The pocket 3858 resides behind aperture 3856 and defines an interior surface 3859 of knuckle 210 that is slightly more than semi-cylindrical. The pocket 3858 intersects with aperture 3854 on one end and is partitioned from aperture 3852 by an interior wall 3860 at the other end. In the illustrated embodiment, the pocket 3858 has a diameter of approximately 6 mm and a length of approximately 17 mm. Because the diameter of the pocket 3858 is slightly larger than the diameter of aperture 3854, an interior circular wall 3861 is formed in the pocket 3858 around aperture 3854. The pocket 3858, as well as the rest of front portion 106, is fabricated from a plastic injection molding process. To ensure uniformity in the diameter of the pocket 3858, the molding tool around which the pocket 3858 is formed is pulled from the pocket 3858 via the aperture 3856 and in a direction that is perpendicular to the axis of rotation 211. By doing so, the pocket 3858 has a uniform shape, such that all cross-sections of the pocket 3858 taken normal to the axis of rotation 211 would be substantially identical. The uniform shape of the pocket 3858 is substantially semi-cylindrical with a slight draft angle needed for ejection of the molding tool.

To accommodate the hinge 3800, knuckles 208 and 210 of the front portion 110 of the bottom housing 108 of FIG. 1 have a socket 3862 and a shaft 3864, respectively. The socket 3862 is a female-type connector formed in a surface of knuckle 208 that faces knuckle 210. In the illustrated embodiment, the socket 3862 has a depth of approximately 3 mm and is shaped to accept and secure a "Y"-shaped prong or other suitably shaped prong. The shaft 3864 is a male-type connector and is carried on a surface of knuckle 210 that faces knuckle 208. The shaft is cylindrical and, in the illustrated embodiment, has a diameter of approximately 6 mm.

Assembly of the hinge 3800 to front portions 106 and 110 is described in the following with reference to FIGS. 3–5. First, the hinge 3800 is assembled. The spring 3806 is inserted into the follower 3804. One end of the spring 3806 is inserted into the circular opening 3828 of body 3820 of the follower 3804, as depicted by line 3872. The cam 3802 is placed on the follower 3804. The can 3810 of the cam 3802 is placed on head 3824 of the follower 3804, as depicted by line 3876, such that the dome 4011 of the post 4006 of head 3824 inserts into the open end of the can 3810 and tips 4012 and 4014 of fingers 4008 and 4010 engage the arc of curved segment 4205 of the bearing surfaces 3818 and 3819, respectively, of the can 3810.

Next, the hinge 3800 is inserted into the pocket 3858 of front portion 106. The hinge 3800 is positioned such that the exposed end of the spring 3806 extends into the pocket 3858 via aperture 3856 and engages the interior wall 3860 at approximately a 30° angle, as depicted by line 3874. Using a tool, the hinge 3800 is then urged toward the interior wall 3860 to compress substantially all of the spring 3806 into body 3820 of the follower 3804. While the spring 3806 is compressed, the cam 3802 and the follower 3804 are swung into the pocket 3858 via aperture 3856 until exterior surface 3832 of body 3820 of the follower 3804 juxtaposes interior surface 3859 of knuckle 210 and head 3808 of the cam 3802 is positioned in the pocket 3858 such that the prong 3814 is aligned with aperture 3854. Once positioned, the hinge 3800 is released allowing the spring 3806 to decompress and force the prong 3814 of head 3808 of the cam 3802 through aperture 3854, as depicted by line 3870. Once installed in front portion 106, the rectangular solid portion of body 3820 of the follower 3804 and the arm 3822 of the follower 3804 reside beyond aperture 3856 and outside of the pocket; and the prong 3814 of head 3808 of the cam 3802 extends from one end of knuckle 210 outside aperture 3854, body 3812 of head 3808 of the cam 3802 resides against the interior surface formed by aperture 3854, and the can 3810 of the cam 3802 resides in the pocket 3858 with surface 3906 abutting the interior circular wall 3861 of the pocket 3858.

Figure 6:
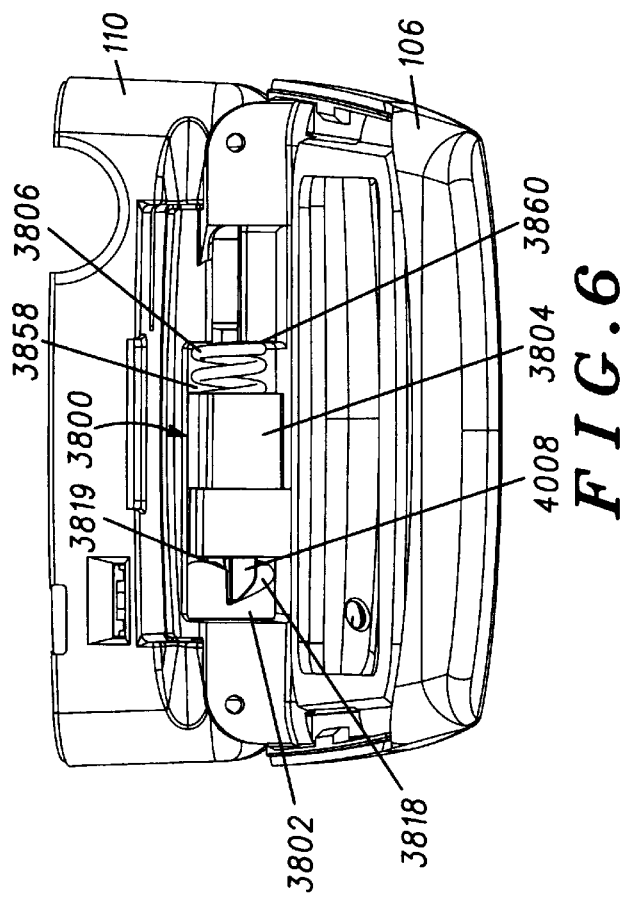
FIG. 6 is a consolidated, fragmentary, bottom perspective view of the foldable device of FIG. 1 in the opened position.

Finally, front portion 106 is attached to front portion 110. Front portion 106 is attached to front portion 110 from the opened position as shown in FIG. 2. Front portion 106 is positioned at angle θ, or approximately 160°, with respect to front portion 110 and tilted as it is brought towards front portion 110 to feed the shaft 3864 of knuckle 206 into aperture 3852, as depicted by line 3866. Once aperture 3852 and the shaft 3864 are engaged, the hinge 3800 is compressed to retract the prong 3814 of the cam 3802 into knuckle 210. Front portion 106 is leveled so that knuckle 210 resides between knuckles 206 and 208 and aperture 3854 aligns with the socket 3862. The hinge 3800 is then released causing the prong 3814 to move through aperture 3854 and mate with the socket 3862, as depicted by lines 3868. Once engaged, the prong 3814 is locked into the socket 3862 rendering the cam 3802 stationary. Complete assembly of the hinge 3800 to front portions 106 and 110 is shown in FIG. 6.

Operation of the hinge 3800 will now be described primarily in conjunction with FIGS. 3–8. When the radiotelephone 100 of FIG. 1 is in the opened position shown in FIG. 2, the position of the hinge 3800, as shown in FIG. 6, is defined by the axial displacement of the follower 3804 in the pocket 3858 towards the cam 3802 as evidenced by the visibility of multiple coils of the spring 3806. Tips 4012 and 4014 of fingers 4008 and 4010 of the follower 3804 rest in the arc of curved segment 4205 of bearing surfaces 3818 and 3819, respectively, at points 4214 and 4216, respectively, as shown in FIG. 7.

As the radiotelephone 100 is moved from the opened position to the closed position shown in FIG. 1, the cam 3802 remains stationary, the follower 3804 moves in the pocket 3858 along the axis of rotation 211, and tips 4012 and 4014 of fingers 4008 and 4010 traverse bearing surfaces 3818 and 3819, respectively. Movement to the closed position is initiated by urging front portion 106 clockwise with respect to front portion 110. This causes tips 4012 and 4014 to move from curved segment 4205 of bearing surfaces 3818 and 3819, respectively; angled surfaces 4020 and 4022 of fingers 4008 and 4010 to contact, and ride up, angled segment 4203 of bearing surfaces 3818 and 3819, respectively; and the follower 3804 to move toward the interior wall 3860 of the pocket 3858 compressing the spring 3806. Angled surfaces 4020 and 4022 of fingers 4008 and 4010 ride angled segment 4203 of bearing surfaces 3818 and 3819, respectively, and the follower 3804 continues to move toward the interior wall 3860 of the pocket 3858 compressing the spring 3806, until the apex of the arc of curved segment 4204 of bearing surfaces 3818 and 3819 is reached. As tips 4012 and 4014 pass the apex of the arc of curved segment 4204 of bearing surfaces 3818 and 3819, respectively, the follower begins to move toward the cam 3802 and the spring 3806 begins to decompress. As front portion 106 is brought into juxtaposition with front portion 110, tips 4012 and 4014 come to rest on bearing surfaces 3818 and 3819, respectively, at points 4210 and 4212, respectively, as shown in FIG. 7. Point 4210 is located on the arm of curved segment 4210 of bearing surface 3818 in close proximity to angled segment 4202 of bearing surface 3818. Point 4212 is located on the arm of curved segment 4210 of bearing surface 3819 in close proximity to angled segment 4202 of bearing surface 3819. At points 4210 and 4212 the spring 3806 remains partially compressed and preloaded to hold front portions 106 and 110 in juxtaposition. The asymmetry of tips 4012 and 4014 allows closer positioning of fingers 4008 and 4010 to angled segment 4202 of bearing surfaces 3818 and 3819, respectively, without increasing the opportunity for tips 4012 and 4014 to travel down the angled segment 4202 of bearing surfaces 3818 and 3819 and cause "lock up" of the hinge 3800. This close positioning maximizes the angle of rotation of front portion 106 with respect to front portion 110, while maintaining a symmetrical design. The symmetrical design of fingers 4008 and 4010 of the follower 3804 and bearing surfaces 3818 and 3819 of the cam 3802 is desirable because it minimizes wear and extends the operation life of the hinge 3800.

Figure 8:
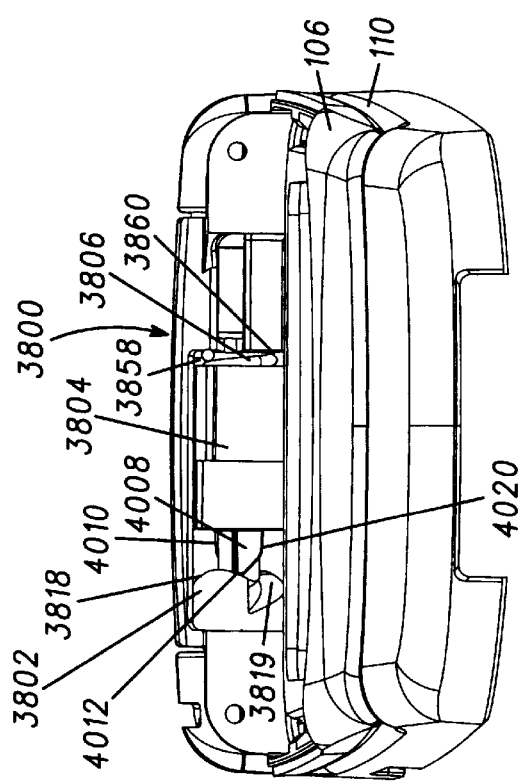
FIG. 8 is a consolidated, fragmentary, top perspective view of the foldable device of FIG. 1 in the closed position.

At this point, the front portion 106 is juxtaposed front portion 110 and the radiotelephone 100 is in the closed position shown in FIG. 1. The position of the hinge 3800, as shown in FIG. 8, is defined by the axial displacement of the follower 3804 away the cam 3802 as evidenced by lack of visibility of the spring 3806 and close proximity of the follower 3804 to interior wall 3860 of the pocket 3858.

Movement of the radiotelephone 100 from the closed position shown in FIG. 1 back to the opened position shown in FIG. 2 is accomplished by substantially reversing the aforementioned steps. In particular, as front portion 106 is rotated counterclockwise away from front portion 110, tips 4012 and 4014 move up the arm of curved segment 4202 of bearing surfaces 3818 and 3819, respectively, and the follower 3804 is forced along the axis of rotation 211 in a direction away from the cam 3802 causing the spring 3806 to compress. At the apex of the arc of curved segment 4204, tips 4012 and 4014 are maintained in contact with bearing surfaces 3818 and 3819, respectively, by the dome 4011 of the post 4006 of the follower 3804, which rides in the opened end of the can 3810 of the cam 3802. As tips 4012 and 4014 clear the arc of curved segment 4204 of bearing surfaces 3818 and 3819, respectively, angled surfaces 4020 and 4022 of fingers 4008 and 4010 come in contact with angled segment 4203 of bearing surfaces 3818 and 3819, respectively, and the spring 3806 begins to decompress. The spring 3806, while decompressing, forces the follower 3804 along the axis of rotation 211 in a direction toward the cam 3802. As the follower 3804 is forced toward the cam 3802, angled surfaces 4020 and 4022 are propelled along angled segment 4203 of bearing surfaces 3818 and 3819. This assists the counterclockwise rotation of front portion 106. The follower 3804 continues to move toward the cam 3802 until tips 4012 and 4014 come to rest in curved segment 4205 of bearing surfaces 3818 and 3819, respectively, at points 4214 and 4216, respectively.

Figure 9:
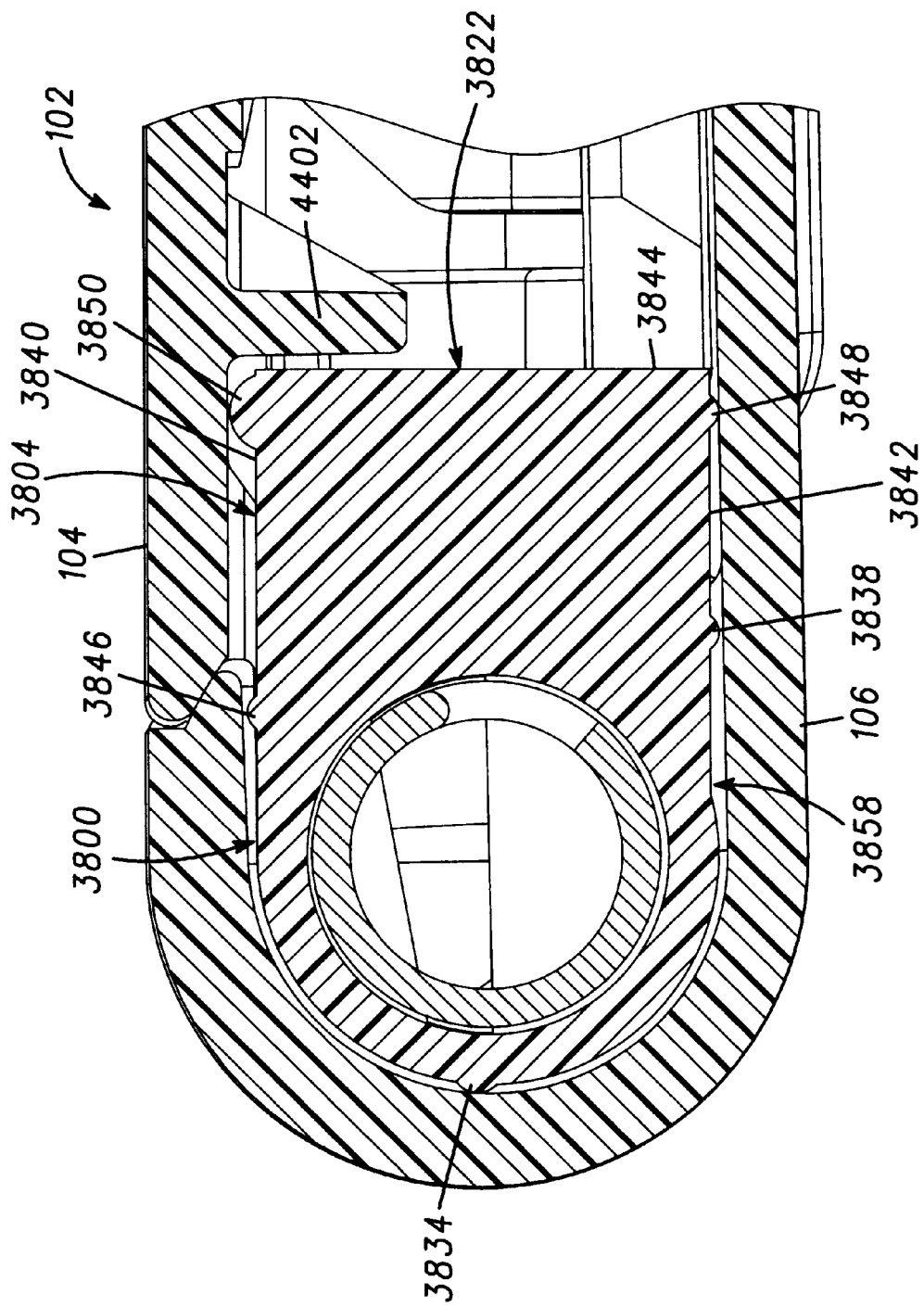
FIG. 9 is a fragmentary cross-sectional view of a top housing of the foldable device of FIG. 1 taken across the section lines 9—9 of FIG. 1.

The follower 3804 is under a relatively large force as the radiotelephone 100 is moved between the opened and closed positions. In particular, as tips 4012 and 4014 move up and over the arc of curved segment 4202 of bearing surfaces 3818 and 3819, respectively, the follower 3804 tends to want to rotate in the pocket 3858 about the axis of rotation 211 of FIG. 2. Rotation of the follower 3804 would cause collisions between the follower 3804 and portions 104 and 106 of the top housing 102 sufficient to generate an audible clicking noise. Ribs 3834, 3838, 3846, 3848, and 3850 of the follower 3804 of FIGS. 3 and 5 and the uniformity of the diameter of the pocket 3858, as described above, prevent such collisions and restrict movement of the follower 3804 linearly along the axis of rotation 211. In particular, ribs 3848 and 3850 on bottom and top surfaces 3842 and 3840, respectively, of the arm 3822 of the follower 3804 engage inner surfaces of back and front portions 104 and 106 of the top housing 102, as shown in FIG. 9. Ribs 3848 and 3850 prevent the follower 3804 from internally rotating about the axis of rotation 211 and generating an audible clicking noise as the radiotelephone 100 is moved between the opened and closed positions. A rib 4402 extending downward from an inner surface of back portion 104 abuts right surface 3844 of the arm 3822 to maintain alignment of the hinge 3800 and guide movement of the follower 3804 along the axis of rotation 211.

While particular embodiments of the present invention have been shown, described, and preferred, modifications may be made. For example, the cam 3802 could function as the movable element while the follower 3804 operates as the stationary element. It will also be understood that the interface between the cam 3802 and the follower 3804 could alternatively consist of a mirrored cam arrangement, an asymmetrical single finger arrangement, or the like. Although shown to be incorporated into the radiotelephone 100, it will be recognized that the hinge 3800 may also be beneficially used in other foldable devices, including but not limited to, pagers, laptop computers, personal digital assistants, landline telephones, cordless telephones, and the like. It is therefore intended in the appended claims to cover all such changes and modifications which fall within the true spirit and scope of the invention.

What is claimed is:

1. A foldable device comprising:

a first housing comprising first and second spaced knuckles;

a second housing comprising a central knuckle, the central knuckle aligned between the first and second knuckles and along an axis of rotation of the first and second housings, one end of the central knuckle juxtaposed with the first spaced knuckle and the other end of the central knuckle juxtaposed with the second spaced knuckle, the central knuckle having an aperture located between the ends thereof and a pocket positioned behind the aperture, the pocket having a uniform diameter along the axis of rotation; and a hinge received in the pocket to rotatably join the first and second housings, the hinge comprising a stationary element and a movable element, the movable element restricted to movement in the pocket along the axis of rotation.

2. A foldable device according to claim 1 wherein the movable element comprises a body and an arm, the body positioned in the pocket, the arm extending through the aperture to reside outside of the pocket.

3. A foldable device according to claim 2 wherein the second housing comprises a first inner surface and a second inner surface opposite to the first inner surface, and the arm comprises a first rib and a second rib, the first rib contacting the first inner surface, the second rib contacting the second inner surface.

4. A foldable device according to claim 1 wherein the pocket is formable around a molding tool, and the aperture is sized to pass the molding tool therethrough in a direction perpendicular to the axis of rotation.

5. A foldable device according to claim 4 wherein the uniform diameter of the pocket is characterized by a slight draft angle to facilitate ejection of the molding tool.

6. A foldable device according to claim 1 wherein the first spaced knuckle comprises a socket, the one end of the central knuckle juxtaposed with the first spaced knuckle has a second aperture, the stationary element comprises a prong, the prong extending outside of the pocket through the second aperture to mate with the socket, thereby securing the one end of the central knuckle in juxtaposition with the first spaced knuckle.

7. A foldable device according to claim 6 wherein the prong is "Y"-shaped.

8. A foldable device according to claim 6 wherein the second spaced knuckle comprises a shaft, the other end of the central knuckle juxtaposed with the second spaced knuckle has a third aperture, the third aperture sized to receive the shaft, thereby, promoting juxtaposition between the other end of the central knuckle and the second spaced knuckle.

9. A foldable device according to claim 1 wherein the stationary element has two ends, one end of the stationary element secured to the first spaced knuckle, the other end of the stationary element contacting the movable element, the movable element has two ends, one end of the movable element contacting the stationary element, the other end of the movable element having an opening, and the hinge further comprises a spring positioned in the pocket, the spring having two ends, one end of the spring positioned in the pocket, the other end of the spring inserted into the opening of the other end of the movable element such that at least a portion of the spring resides within the movable element.

10. A foldable device according to claim 9 wherein the other end of the stationary element contacts the one end of the movable element in a cam-follower relationship, the cam portion of the cam-follower relationship comprising a profile defined by first and second bearing surfaces, the follower portion of the cam-follower relationship comprising first and second fingers, the first finger comprising a tip to contact the first bearing surface, and the second finger comprising a tip to contact the second bearing surface.

11. A foldable device according to claim 10 wherein the follower portion further comprises:

a surface; and a post extending perpendicularly from the surface of the follower portion, the post positioned between the first and second fingers to engage the cam portion between the first and second bearing surfaces.

12. A foldable device comprising:

a first housing;

a second housing; and a hinge rotatably coupling the first and second housings, the hinge comprising a cam and a follower, the cam comprising a profile defined by first and second bearing surfaces, the follower comprising first and second fingers, the first finger comprising a tip to contact the first bearing surface, the second finger comprising a tip to contact the second bearing surface, the first finger being non-symmetrical about the tip thereof, and the second finger being non-symmetrical about the tip thereof, the follower further comprising a post positioned between the first and second fingers, at least a portion of the post extending between the first and second bearing surfaces.

13. A foldable device according to claim 12 wherein the first and second fingers are 180° symmetrical across the post.

14. A foldable device according to claim 12 wherein the follower further comprises a surface, the first finger is carried on the surface of the follower, the first finger having a shape defined by opposing flat and curved surfaces, the flat surface of the first finger extending perpendicularly between the surface of the follower and the tip of the first finger, and the curved surface of the first finger extending between the surface of the follower and the tip of the first finger, and the second finger is carried on the surface of the follower, the second finger having a shape defined by opposing flat and curved surfaces, the flat surface of the second finger extending perpendicularly between the surface of the follower and the tip of the second finger, and the curved surface of the second finger extending between the surface of the follower and the tip of the second finger.

15. A foldable device according to claim 14 wherein the curved surface of the first finger is formed of a first angled portion and a second angled portion, the first angled portion of the curved surface of the first finger extending from the tip of the first finger at an angle of approximately 40 degrees with respect to the flat surface of the first finger, and the second angled portion of the curved surface of the first finger extending from the surface of the follower at an angle slightly less than 90 degrees with respect thereto, and the curved surface of the second finger is formed of a first angled portion and a second angled portion, the first angled portion of the curved surface of the second finger extending from the tip of the second finger at an angle of approximately 40 degrees with respect to the flat surface of the second finger, and the second angled portion of the curved surface of the second finger extending from the surface of the follower at an angle slightly less than 90 degrees with respect thereto.

16. A foldable device according to claim 12 wherein at least a portion of the cam is generally cylindrical with an opening at one end, the at least a portion of the cam at the opening defined by an outer surface and an inner surface, the profile is formed at the one end between the outer and inner surfaces, the first bearing surface comprises one half of the profile, the first bearing surface having an apex offset from a midpoint of the first bearing surface, and the second bearing surface comprises the other half of the profile, the second bearing surface having an apex offset from a midpoint of the second bearing surface.

17. A foldable device according to claim 16 wherein the first bearing surface has a curved segment proximate to the apex of the first bearing surface, the outer surface extending beyond the inner surface at the curved segment of the first bearing surface, and the second bearing surface has a curved segment proximate to the apex of the second bearing surface, the outer surface extending beyond the inner surface at the curved segment of the second bearing surface.

18. A foldable device according to claim 16 wherein a distal end of the post is positioned in the opening at the one end of the cam.

19. A foldable device according to claim 12 wherein the first housing comprises first and second spaced knuckles, the second housing comprises a central knuckle, the central knuckle aligned between the first and second knuckles and along an axis of rotation of the first and second housings, one end of the central knuckle is juxtaposed with the first spaced knuckle and the other end of the central knuckle is juxtaposed with the second spaced knuckle, the central knuckle having an aperture located between the ends thereof and a pocket positioned behind the aperture, the pocket having a uniform diameter along the axis of rotation, the hinge is received in the pocket, one of the cam and the follower is stationary, and the other one of the cam and the follower being movable, the other one of the cam and the follower restricted to movement in the pocket along the axis of rotation.

20. A foldable device according to claim 19 wherein the second housing comprises a first inner surface and a second inner surface opposite the first inner surface, and the other one of the cam and the follower comprises a body and an arm, the body positioned in the pocket, the arm extending through the aperture to reside outside of the pocket, the arm comprising a first rib and a second rib, the first rib contacting the first inner surface, and the second rib contacting the second inner surface.

* * * * *